Dec. 13, 1949     L. R. MUSKAT     2,491,056
AUTOMATIC WEIGHING MACHINE

Filed Dec. 19, 1945     3 Sheets-Sheet 1

Inventor
Louis R. Muskat
by Arthur W. Nelson
Atty.

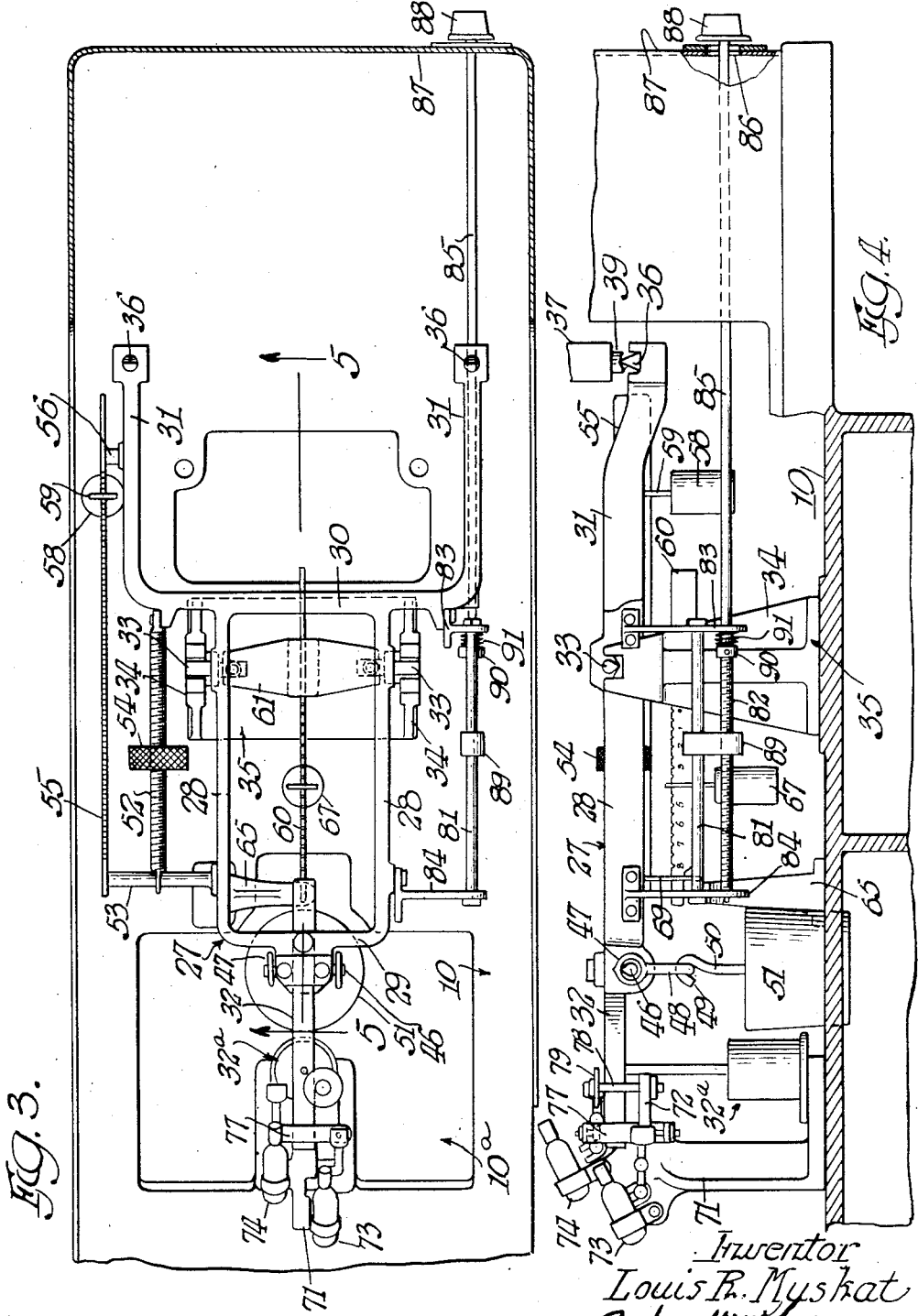

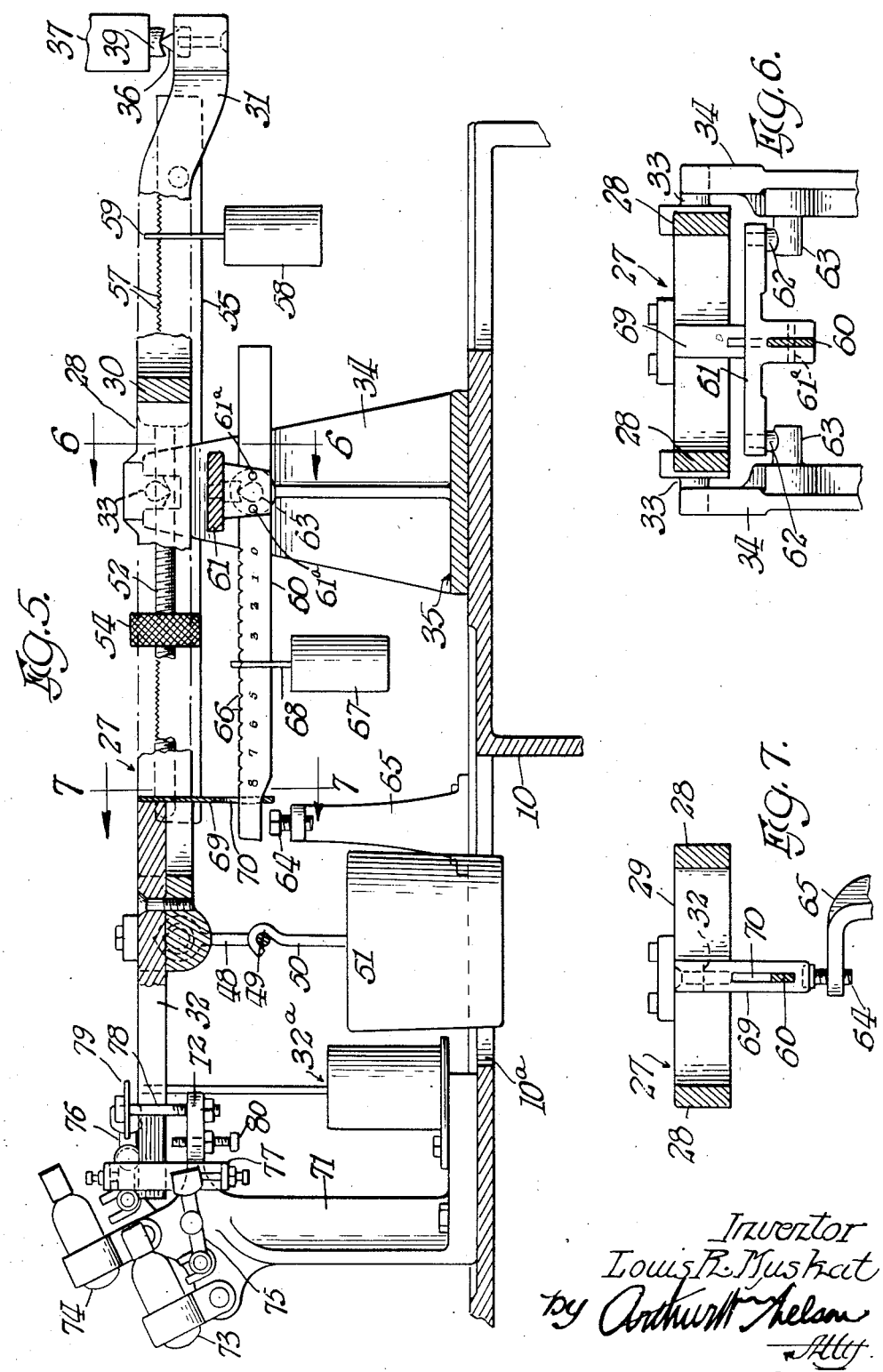

Patented Dec. 13, 1949

2,491,056

UNITED STATES PATENT OFFICE 2,491,056

AUTOMATIC WEIGHING MACHINE

Louis R. Muskat, Oak Park, Ill., assignor to Triangle Package Machinery Company, Chicago, Ill., a corporation of Illinois Application December 19, 1945, Serial No. 635,970

5 Claims. (Cl. 249—19)

This invention relates to improvements in automatic weighing machines and it consists of the matters hereinafter described and more particularly pointed out in the appended claims.

The invention is particularly concerned with weighing machines that include means for bulk feeding a large part of a predetermined weight amount of a commodity to a receptacle and means for dribble feeding additional commodity to said receptacle to make up or to complete accurately the predetermined weight amount of the commodity to be fed to said receptacle and which, for example, may be one pound.

Different commodities have different weighing characteristics and require different handling in weighing out predetermined weight amounts thereof in succession so that such amounts will be uniform. For instance, in weighing out commodities into uniform amounts of a pound each, with some commodities weighing speed and accuracy is obtained when bulk feeding thirteen ounces thereof and dribble feeding the remaining three ounces to make up each pound. With other commodities accuracy and better weighing speed is obtained by bulk feeding fourteen ounces of the commodity and by dribble feeding two ounces to make up each pound. Thus, in weighing out pound amounts of different commodities, or other amounts, the weight ration of the bulk feed and the dribble feed thereof should vary.

One of the objects of the present invention is to provide in an automatic weighing machine, simple and efficient means whereby the weight ratio of the bulk feed and the dribble feed for the commodity being weighed may be quickly and readily changed to meet the weighing characteristics of different commodities without affecting the accuracy in weighing out uniform weight amounts thereof.

Another object of the invention is to provide in automatic weighing machines, means of the kind mentioned, which may be adjusted within certain limits without confusion by the average weighing machine operator and by means arranged conveniently for the operator to obtain accuracy in weighing and this without stopping the operation of the machine.

The above mentioned objects of the invention, as well as others, along with the several advantages thereof will more fully appear as the specification proceeds.

In the drawings:

Fig. 3 is a horizontal sectional view through a part of the machine, as taken on the line 3—3 and on a scale somewhat larger than that of Fig. 1, but omitting the showing of the rotative bucket therein.

Fig. 4 is a view in side elevation of the parts shown in Fig. 3, certain portions being shown in section for better illustration.

Fig. 5 is a longitudinal vertical sectional view through parts of the machine as taken on the line 5—5 and on a scale enlarged over that of Fig. 3.

Figs. 6 and 7 respectively are fragmentary detail transverse vertical sectional views through parts of the machine appearing in Fig. 5, as taken on the line 6—6 and 7—7 respectively thereof.

Figure 1:
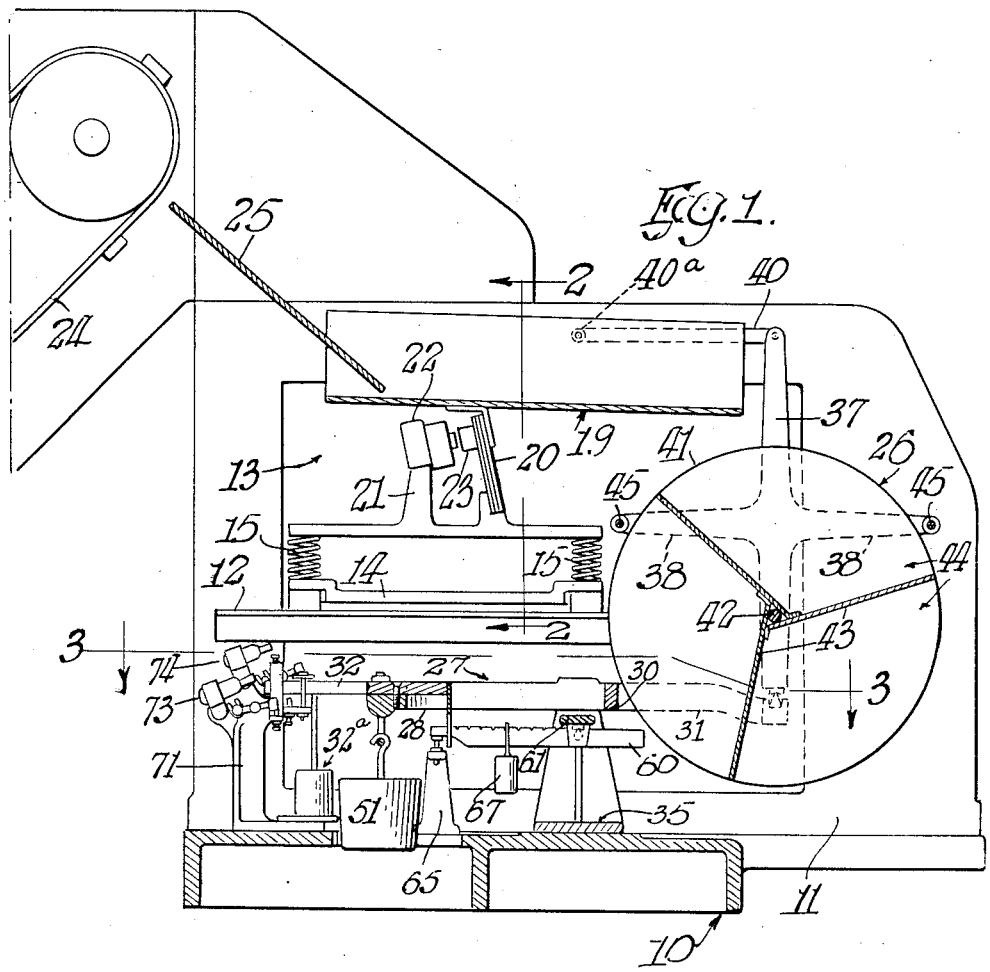
Fig. 1 is a longitudinal vertical sectional view through an automatic weighing machine of the rotating bucket and vibratory tray type, embodying the preferred form of the invention.

Referring now in detail to that embodiment of the invention appearing in the drawings and especially to Fig. 1 thereof, the machine includes a horizontally disposed base 10 that is usually supported in the desired elevation by a suitable stand, not shown, as it forms no particular part of the present invention.

Figure 2:
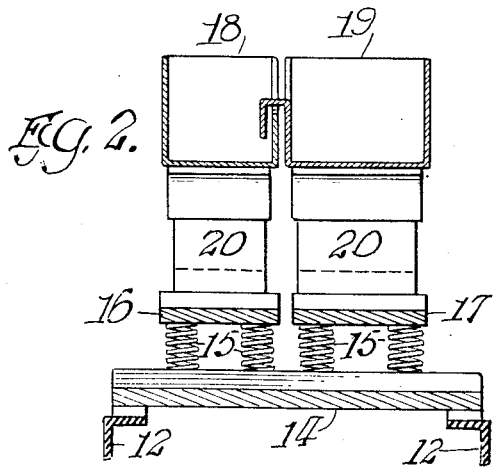
Fig. 2 is a vertical sectional view through the vibrating bulk and dribble commodity feeding means of the machine as taken on the line 2—2 of Fig. 1.

At each side of the base is an upright side frame 11 and to the inner face of each frame is fixed an angle bar 12 that spans a relatively large opening 13 in the frame. A platform 14 is supported at its sides upon the bars 12—12 and spaced thereabove and supported by shock and vibration absorbing springs 15 are laterally spaced platform plates 16 and 17 respectively, as shown in Fig. 2. Arranged above each platform plate is an open ended substantially horizontal commodity feeding tray 18 and 19 respectively. Each tray is supported for longitudinal vibration from its platform plate by a set of spring leaves 20 and spaced back of each set of spring leaves is located an upwardly extending part 21 that supports an electro magnetic coil 22. Associated with each coil 22 is an armature 23 carried by the leaves 20. When the coils 22 are energized, they will, through the armatures 23—23, cause a longitudinal vibration of the trays.

The trays 18 and 19 are of different cross sectional areas and volume and one tray constitutes the dribble feed tray for the machine, while the other tray constitutes the bulk feed tray of the machine.

At the rear end of the upper portion of the side frames 11—11 is an endless conveyor 24 which leads from a suitable hopper for the commodity to be weighed out into the predetermined weight amounts, say one pound each. This conveyor discharges the commodity from its top or upper end, onto an inclined guide board 25 which directs the commodity into the bottom of the trays forwardly of the open rear end thereof. In the vibration of the trays, the commodity discharged thereinto is fed forwardly to be discharged from the front end thereof as a relatively heavy bulk feed stream and a relatively fine or light dribble feed stream, into a receiving receptacle 26, which will be later mentioned in more detail.

Located on the base 10 is the weighing mechanism of the machine, which includes a substantially horizontally disposed, tiltably mounted open frame-like scale beam 27. As best appears in Fig. 3, this beam includes laterally spaced side beam members 28—28 connected at the rear end by a transverse bar 29 and at the front end by another transverse bar 30, which projects beyond the members 28—28 and is turned forwardly as arms 31—31 that are spaced a greater distance apart than said members 28—28. 32 indicates the tail piece for the beam and which is so fixed in the mid portion of the bar 29 as to extend forwardly and rearwardly therefrom.

The side members 28—28 of the beam are provided with outwardly extending aligned bearing blades 33—33 a short distance to the rear of the bar 30 and these blades each engage in a bearing block in the upper ends of the uprights 34—34 of a bracket 35 that extends transversely of the base 10 and is suitably secured thereto. By means of the blades and bearing blocks mentioned, the beam 27 as a whole is capable of a limited tilting or rocking movement.

The arms 31—31 constitute the weighing receptacle supporting arms of the beam and each is provided in the upper face of the front end with a blade 36. Resting on each blade 36 is a cruciform bail, each including an upright member 37 and forwardly and rearwardly extending horizontal members 38—38 respectively. The lower end of the upright member 37 carries a bearing element 39 for engagement with an associated blade 36. The upper end of each upright member has pivoted thereto the front end of a retaining link 40 (see Fig. 1) the other end of which is pivotally attached at 40a to an associated side frame 11 above the opening 13 therein.

The receptacle 26, before mentioned, in this instance is in the form of a step by step rotating bucket that includes circular end plates or discs 41—41 and a shaft 42 arranged axially of said discs and has end portions which extend beyond the same to be journalled in the uprights 37—37 of the parts before mentioned. Extending between said end discs or plates is a plurality of partitions 43—43 which divide the bucket into compartments 44—44, each to receive the commodity discharged from the front ends of the trays 18 and 19 when each compartment is in the upwardly opening or facing position, as appears in Fig. 1. The ends of the members 38—38 of the bails, before mentioned, are connected together outside the periphery of the discs or plates 41 by tie rods 45—45.

By means of the parts just above mentioned, the bails are held in such a manner as to ride upwardly and downwardly in the tilting of the beam 27 without a displacement from their supporting position for the receptacle or bucket 26 and which movement is quite small and in practice amounts to only about ⅛ of an inch.

It is pointed out that each time the uppermost compartment of the receptacle or bucket 24 has received a commodity, in the amount by weight for which the weighing mechanism is set, said bucket is turned to discharge the weighed out amount of commodity into a suitable spout or container (not shown) and to bring another compartment into said uppermost or filling position to receive its portion of the commodity discharged from the trays 18 and 19. While the bucket is power actuated by suitable mechanism to turn or rotate step by step, said mechanism forms no part of the present invention, and is therefore neither illustrated nor described herein.

It is obvious that the part of the beam 27 rearwardly of its pivot blades 33 and associated bearing blocks on the uprights 34—34 must balance that part of the beam forwardly of said blades and bearing blocks, plus the weight of the receptacle or bucket 26 and the bails and connecting tie rods mentioned. In the present instance I provide a non-adjustable approximate balance means and an adjustable balance means therefor, now to be described.

A rear extension of the bar 29, on the longitudinal medial line of the beam, is provided with laterally extending blades 46—46 to receive the bearing eyes 47—47 on a U-shaped hanger 48. This hanger has engaged therewith the hook 49 of a stem 50 that supports the main balance weight 51 for the beam, there being an opening 10a (see Fig. 3) in the base 10 to accommodate the movement of this weight in the tilting or rocking of the beam. The weight 51 is made up of a metal container for holding a suitable amount of lead and which is poured into the container in a molten condition. It is obvious that it is indeed difficult to provide a weight 51 which in itself would accurately balance the arms 31 of the beam along with the bails and receptacle mentioned. Thus this weight is the non-adjustable weight for the beam. The adjustable weight for the beam is therefore necessary to accurately balance the beam and one form thereof is as follows:

52 indicates a longitudinally extending threaded shaft that is spaced outwardly from and is parallel with one of the members 28 of the beam. As best shown in Fig. 3, the rear end of said shaft is supported by an arm 53 that extends laterally from said one of the members 28 and the front end of said shaft is supported from one end of the cross bar 30 of the beam. On said shaft is threaded a nut-like weight 54. By turning said nut-like weight in one direction or the other, it will travel longitudinally of the shaft, toward or away from the axis of the main bearing for the beam as constituted by the blades 33 and associated bearing blocks. By moving the weight along said shaft, it is possible to obtain an accurate balance of the beam. When the weight 54 has been moved into this position it may be locked in said position in any suitable manner.

The beam 27 has associated therewith a bulk feed poise bar and weight and a dribble feed poise bar and whereby it is possible to set the beam for accurately weighing out units of the commodity in any predetermined weight amount thereof within the capacity of the machine. Assume, therefore, that the weighed out units of the commodity are to be one pound each. Different commodities have different weighing characteristics. For speed and accuracy in weighing different commodities, it might be necessary to change the ratio by weight between the bulk feed and the dribble feed thereof and which, when added together, make up a pound or other unit in weight. Thus, with some commodities for each pound unit weighed out, the bulk feed may aggregate thirteen ounces and the dribble feed three ounces, and with other commodities best results may be obtained by weighing out twelve or fourteen ounces by bulk feed and four or two ounces by dribble feed. In any ratio the combined ounces in weight for both bulk feed and for dribble feed of the commodity will total the desired weight for the weighed out unit weight amount, which in the example, is one pound.

The bulk feed poise bar, which is indicated as a whole at 55 (see Fig. 3) is constituted by a longitudinally extending bar that is supported at its rear end from the arm 53, before mentioned, and is supported at its front end by means of a stud 56 on one of the beam arms 31. Thus, it is obvious from said Fig. 3 that the ends of said bar extend rearwardly and forwardly of the axis about which the beam 27 tilts or rocks as provided by the blades 33 and associated bearing blocks. This bar is serrated along its top edge to provide the spaced notches 57 (see Fig. 5). It has associated therewith a weight 58 provided at the top with a yoke 59 for engagement in a desired notch 57. Thus, the weight 58 may be moved into different positions along the bar to provide an adjustment of the bulk feed of the commodity.

The dribble feed poise bar, which is indicated as a whole as at 60 (see Fig. 5) is located in the medial line of the beam and is shorter in length than the bulk feed poise bar and it extends parallel therewith. It is supported toward its front end by means of a bridge 61, being attached in a central depending bifurcated portion thereof by means of pins 61a best appearing in Figs. 5 and 6. This bridge is mounted for a rocking movement in a plane parallel with but below the axis about which the beam as a whole tilts or rocks. At each end of the bridge is provided a downwardly extending bearing element 62 and each element engages on a blade 63 that extends inwardly from the associated upright 34 of the standard 35.

The rear end of said dribble feed poise bar is reduced in its width (vertically) and is normally engaged upon and supported by an adjustable stud 64 carried by the upper end of a bracket 65 that rises from the base 10. In the upper edge of the bar 60 is a plurality of longitudinally spaced notches 66 that indicate "ounces" and "half ounces." Associated with the dribble feed poise bar is a weight 67 provided at the top with a yoke 68 for engagement in a desired notch 66. Thus this weight may be moved into different positions along the bar to provide an adjustment in ounces and half ounces for the dribble feed of the commodity.

Depending from the front end of the tail piece 32 is a "pick up" yoke 69 for the dribble feed poise bar. The bottom end of said yoke has a vertically elongated slot 70 therein through which the rear end of the bar 60 extends, the slot having such length as to have a lost motion or play relative to the rear end of said bar. When the front end of the beam 27 is in the "up" position, as occurs after a rotative step of the bucket 26 to discharge a weighed out amount of commodity, the rear end of said bar 60 rests upon the screw 64 and the bottom end of the slot 70 is spaced below the bottom edge of that part of the bar in line therewith. When the bulk feed amount of commodity has been fed into a bucket compartment 44, the said end of the beam 27 descends and the rear end thereof ascends. In this ascending movement of the rear end of the bar after the "play" in the yoke slot 70 has been taken up, it lifts the rear end of the bar 60 and adds the effect of the adjusted weight 67 thereto during the dribble feeding of the commodity.

Mounted on the rear end of the base 10 in line with the tail piece bar 32 of the beam is an upright bracket 71 that includes a forwardly extending arm 72. Supported on said upper portion of the bracket on opposite sides thereof are two switches of the mercury type that include the mercury containing vessels 73 and 74 respectively. Associated with each vessel is a magnet carrying arm 75 and 76 respectively. Said vessels and arms control the action of the electro magnets 22—22 that produce the vibration of the trays 18 and 19. When a magnet is engaged with a vessel, as appears in Fig. 4, it closes a circuit to the associated magnet 22.

The arms 75 and 76 are pivoted at a point between their ends and are both actuated by a yoke 77 on the rear end of the tail piece 32 of the beam 27.

To limit the upward swing or ascension of the tail piece bar of the beam, the bracket arm 72 carries an adjusting screw 78 having a washerlike part 79 at its top end which overhangs a part of the top edge of the bar. To limit the downward swing or descension of the tail piece bar, the bracket arm carries an adjusting screw 80 so arranged as to be engageable by the bottom edge of the tail piece bar. By manipulating the screws mentioned, an accurate adjustment may be made for a proper timing of the action of the mercury switches mentioned. A dash pot mechanism 32a prevents a too rapid tilting of the beam 27.

It is pointed out at this time that in many instances a number of weighing machines are placed side by side as a "gang" for use in connection with automatic packaging machines. When the machines are so arranged it is obvious that it is difficult to reach the weights 58 and 67 of the machines, because of the inaccessibility, to make fine adjustments. This would require not only a separation between the machines, but a stopping of the same to set the weights for accurate weighing and then a test for each weighed out amount as to accuracy in weight. Therefore, to overcome the above and permit a "fine" setting of the beam, for accurate weighing, from a point at the front of each machine where it is readily accessible and operable without stopping the machine, I provide the following construction:

Spaced laterally from one of the sides 28 of the beam and parallel therewith is a smooth surface upper guide rod 81 and below the same is a threaded shaft 82, said bar and said shaft being disposed in the vertical plane of the arm 31 on the same side of the beam. The rod 81 is fixed at its ends in suitable front and rear brackets 83 and 84 respectively carried by the beam 27 and the threaded shaft is journalled in said brackets for a turning movement. The shaft has a portion 85 that extends forwardly to pass through a slot-like opening 86 (see Fig. 4) in the front casing part 87 of the machine. Outside of said casing part, said shaft portion has a knob 88 fixed thereto for turning the shaft 82.

A weight member 89, in the form of a rectangular block, has sliding engagement upon the rod 81 and has a threaded engagement with the shaft 82. Thus, when the shaft is turned in one direction or the other, the weight member 89 is caused to travel rearwardly or forwardly on the rod 81. To eliminate end play in the shaft 82 and which would produce a similar movement of the weight member 89, there is fixed to the shaft 82 near the bracket 83, a collar 90 and an expansion spring 91 (see Fig. 4) surrounds that part of the shaft between the collar 90 and bracket 83. Thus, in the operation of the machine the spring 91 imposes a rearward end thrust on the shaft which holds it against end play.

It is obvious that by turning the knob 88 in either direction the weight member 89 may be caused to travel longitudinally of the shaft in a manner providing a fine adjustment for the weight member. It is to be noted from Fig. 4 that the greater part of the rod 81 is located to the rear of the transverse plane of the axis about which the beam rocks or tilts. Thus, should it be found that a test package weighed out by the machine is but a small fraction of an ounce over or under the intended weighed out amount for the commodity unit, a turning of the shaft 82 in one direction or the other will cause the weight member 89 to be moved along the rod to provide a fine adjustment of the weighing mechanism as a whole to set it for absolute accurate weighing and this without stopping the operation of the machine.

It is obvious from the above that the weight ratio of the bulk feed and the dribble feed of the commodity being weighed may be quickly adjusted to accommodate the weighing characteristics of the commodity being weighed and in a manner insuring accuracy in weighing the commodity into predetermined weight amounts.

While in describing the invention I have referred in detail to the form, arrangement and construction of the parts involved, the same is to be considered only in the illustrative sense so that I do not wish to be limited thereto except as may be specifically set forth in the appended claims.

I claim as my invention:

1. In an automatic weighing machine, means for bulk feeding a commodity and means for dribble feeding said commodity, a receptacle into which both of said feeding means jointly discharge said commodity, control means for each of said feeding means, mechanism for weighing the commodity delivered to said receptacle said mechanism including a beam tiltably mounted between its ends and one of which ends operatively supports said receptacle, a bulk feed poise bar and a dribble feed poise bar for counterbalancing the commodity load in said receptacle, the bulk feed poise bar extending longitudinally of and being carried by said beam and, the dribble feed poise bar extending parallel with said beam and pivotally mounted at one end for tilting movement independently of the beam, means for normally supporting the other end of said dribble feed poise bar, a weight longitudinally adjustable on each bar, one weight for balancing a predetermined weight amount of commodity bulk fed to the receptacle and which weight amount produces an initial part of the tilting of the beam in a weighing operation and the other weight for balancing a predetermined weight amount of commodity dribble fed to said receptacle and which weight amount produces the final part of the tilting movement of the beam in said weighing operation, the sum total of said two last mentioned weight amounts making up the predetermined weight amount of the commodity to be discharged into said receptacle, means carried by said beam for picking up and operatively connecting said dribble feed poise bar to said beam at the end of said initial part of said tilting movement to move therewith in said final part of said tilting movement of the beam, and means carried by said beam and operative at the end of said initial part of the tilting movement of the beam to actuate the control for the bulk feeding means to stop the same and further operative at the end of said final part of the tilting movement of the beam to actuate the control for the dribble feeding means to stop the same.

2. In an automatic weighing machine, means for bulk feeding a commodity and means for dribble feeding said commodity, a receptacle into which both of said feeding means jointly discharge said commodity, control means for each of said feeding means, mechanism for weighing the commodity delivered to said receptacle, said mechanism including a beam, bracket means in which said beam is mounted at a point between its ends for a tilting movement and one of which ends operatively supports said receptacle, a bulk feed poise bar and a dribble feed poise bar for counterbalancing the commodity load in said receptacle, the bulk feed poise bar extending longitudinally of and being carried by said beam, the dribble feed poise bar extending parallel with said beam and pivotally mounted toward one end in said bracket, means for normally supporting the other end of said dribble feed poise bar, a weight longitudinally adjustable on each bar, one weight for balancing a predetermined weight amount of the commodity bulk fed to the receptacle in a weighing operation and the other weight for balancing a predetermined weight amount of the commodity dribble fed to the receptacle in said weighing operation, the sum total of said last two mentioned weight amounts making up the predetermined weight amount of the commodity to be discharged into said receptacle, and means operative in the tilting movement of the beam under the weight of the commodity discharged into said receptacle by said bulk feeding means for picking up and connecting said other end of the dribble feed poise bar to said beam in a weighing operation, and means including parts carried by the beam and operative in said tilting movement thereof for first actuating the control for the bulk feeding means and then said control beams for said dribble feeding means for stopping the same.

3. In an automatic weighing machine, means for bulk feeding a commodity and means for dribble feeding said commodity, a receptacle into which both of said feeding means jointly discharge said commodity, control means for each of said feeding means, mechanism for weighing the commodity delivered to said receptacle, said mechanism including a beam tiltably mounted between its ends and one of which ends operatively supports said receptacle, a bulk feed control poise bar and a dribble feed control poise bar for counterbalancing the commodity load in said receptacle, one of said bars being carried by said beam, and the other of said bars being pivotally mounted toward one end independently of said beam, a weight longitudinally adjustable on each bar, one weight for balancing a predetermined weight amount of the commodity bulk fed to the receptacle and which weight amount of commodity produces the initial part of the tilting movement of the beam in a weighing operation, the other weight balancing a predetermined weight amount of the commodity dribble fed to said receptacle and which weight amount of commodity produces the final part of the tilting movement of the beam in a weighing operation, means operative toward the end of said initial part of the tilting movement of the beam for connecting the other end of the dribble feed control poise bar to said beam for movement therewith in the final part of the tilting movement of the beam, and means including parts carried by said beam and operative in said tilting movement thereof for actuating said control means to stop said bulk feeding means and said dribble feeding means respectively.

4. In an automatic weighing machine, means for bulk feeding a commodity and means for dribble feeding said commodity, a receptacle into which both of said feeding means jointly discharge said commodity, control means for each of said feeding means, mechanism for weighing the commodity delivered to said receptacle, said mechanism including a beam having laterally spaced side portions, means providing laterally spaced uprights upon which the side portions of said beam are pivotally mounted between their ends for a tilting movement, one end of said side portions of the beam operatively supporting said receptacle, a bulk feed poise bar and a dribble feed poise bar, the bulk feed poise bar extending longitudinally of and being supported by one of said side portions of the beam, the dribble feed poise bar extending longitudinally of the beam in its longitudinal median line, means for pivotally mounting one end of said dribble feed poise bar upon said laterally spaced uprights, means normally supporting the other end of said dribble feed poise bar, a weight longitudinally adjustable on each bar, one weight for balancing a predetermined weight amount of commodity bulk fed to the receptacle in a weighing operation and the other weight for balancing a predetermined weight amount of the commodity dribble fed to the receptacle in said weighing operation, the sum total of said last two mentioned weight amounts making up the predetermined weight amount of the commodity to be discharged into said receptacle, means operative in the tilting movement of the beam under the weight of the commodity discharged into the receptacle by said bulk feeding means for picking up and connecting said other end of the dribble feed poise bar to said beam in a weighing operation, and means including parts carried by the beam and operative in said tilting movement thereof for first actuating the control means for said bulk feeding means and then said control means for said dribble feeding means for stopping the same.

5. In an automatic weighing machine, means for bulk feeding a commodity and means for dribble feeding said commodity, a receptacle into which both of said feeding means jointly discharge said commodity, control means for each of said feeding means, mechanism for weighing the commodity delivered to said receptacle, said mechanism including a beam having laterally spaced side portions, means providing laterally spaced uprights upon which the side portions of said beam are pivotally mounted between the ends of said side portions for a tilting movement, one end of said side portions of the beam operatively supporting said receptacle, a bulk feed poise bar and a dribble feed poise bar, the bulk feed poise bar extending longitudinally of and being supported by one of said side portions of the beam, the dribble feed poise bar extending longitudinally of the beam in its longitudinal median line, a bridge member disposed between and pivotally mounted in said laterally spaced uprights, means for operatively attaching one end of said dribble feed poise bar to said bridge member, means normally supporting the other end of said dribble feed poise bar, a weight longitudinally adjustable on each bar, one weight for balancing a predetermined amount of the commodity bulk fed to the receptacle in a weighing operation and the other weight for balancing a predetermined weight amount of commodity dribble fed to the receptacle in said weighing operation, the sum total of said last two mentioned weight amounts making up the predetermined weight amount of the commodity to be discharged into said receptacle, means operative in the tilting movement of the beam under the weight of the commodity discharged into the receptacle by said bulk feeding means for picking up and connecting said other end of the dribble feed poise bar to said beam in a weighing operation, and means including parts carried by said beam and operative in said tilting movement thereof for first actuating the control means for said bulk feeding means, and then said control means for said dribble feeding means for stopping the same.

LOUIS R. MUSKAT.

REFERENCES CITED

The following references are of record in the file of this patent:

UNITED STATES PATENTS

| Number | Name | Date |
| --- | --- | --- |
| Re. 21,169 | McCrery | Aug. 1, 1939 |
| 748,055 | Driver et al. | Dec. 29, 1903 |
| 1,167,584 | Michalis | Jan. 11, 1916 |
| 1,468,129 | Ainsworth | Sept. 18, 1923 |
| 1,949,721 | Klopsteg | Mar. 6, 1934 |
| 2,087,510 | Glutz | July 20, 1937 |
| 2,352,114 | Muskat | June 20, 1944 |